United States Patent
Sakagami (10) Patent No.: US 12,141,645 B2
(45) Date of Patent: Nov. 12, 2024

(54) INFORMATION PROCESSING SYSTEM, INFORMATION PROCESSING METHOD, AND NON-TRANSITORY RECORDING MEDIUM

(71) Applicant: SATO HOLDINGS KABUSHIKI KAISHA, Tokyo (JP)

(72) Inventor: Mitsutoshi Sakagami, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/282,487

(22) PCT Filed: Feb. 9, 2022

(86) PCT No.: PCT/JP2022/005099
§ 371 (c)(1),
(2) Date: Sep. 15, 2023

(87) PCT Pub. No.: WO2022/209329
PCT Pub. Date: Oct. 6, 2022

(65) Prior Publication Data
US 2024/0046052 A1 Feb. 8, 2024

(30) Foreign Application Priority Data
Mar. 31, 2021 (JP) ................ 2021-059174

(51) Int. Cl.
*G06K 7/10* (2006.01)
(52) U.S. Cl.
CPC .............. *G06K 7/10366* (2013.01)
(58) Field of Classification Search
None
See application file for complete search history.

(56) References Cited

U.S. PATENT DOCUMENTS

2011/0140723 A1* 6/2011 Jeong ................ B60R 21/01512
324/705
2020/0223324 A1* 7/2020 Simoni .............. B61D 33/0007

FOREIGN PATENT DOCUMENTS

EP 3 683 090 A1 7/2020
JP S63-163599 A 7/1988
(Continued)

OTHER PUBLICATIONS

Extended European Search Report issued in connection with EP Appl. No. 22779558.0 dated Sep. 10, 2024.

*Primary Examiner* — Kristy A Haupt
(74) *Attorney, Agent, or Firm* — Foley & Lardner LLP (57) ABSTRACT

An embodiment of the present invention is an information processing system including a first radio tag and an information processing device. The first radio tag stores unique tag identification information and is configured to be attached to a seating surface or a backrest surface of a seating unit. The information processing device includes a storage that stores information on a user of a seating unit and tag identification information of a radio tag attached to the seating unit, in an associated manner. The information processing device also includes an acquisition unit and a control unit. The acquisition unit is configured to acquire the tag identification information when the first radio tag transmits a signal containing the tag identification information. The control unit is configured to determine whether the user is seated on the seating unit, based on acquisition or non-acquisition of the tag identification information.

7 Claims, 9 Drawing Sheets

(56) References Cited

FOREIGN PATENT DOCUMENTS

| | | | |
|---|---|---|---|
| JP | 2003-259570 A | 9/2003 | |
| JP | 2006-226823 A | 8/2006 | |
| JP | 2006-285636 A | 10/2006 | |
| JP | 2006-350841 A | 12/2006 | |
| JP | 2018-000425 A | 1/2018 | |
| JP | 2018-101305 A | 6/2018 | |
| JP | 2019-021979 A | 2/2019 | |
| JP | 2020175808 A * | 10/2020 | ............. A63F 13/21 |
| WO | WO-2020/262839 A1 | 12/2020 | |

* cited by examiner

| TAG ID OF TAG T1 | TAG ID OF TAG T2 | USER INFORMATION | |
|---|---|---|---|
| | | USER ID | SEAT OCCUPANCY AND VACANCY INFORMATION |
| ID***** | ID***** | U001 | SITTING |
| ID***** | ID***** | U002 | LEAVING |
| ID***** | ID***** | U003 | SITTING |
| ⋮ | ⋮ | ⋮ | ⋮ |

SEAT OCCUPANCY AND VACANCY DATABASE

INFORMATION PROCESSING SYSTEM, INFORMATION PROCESSING METHOD, AND NON-TRANSITORY RECORDING MEDIUM

FIELD

The present invention relates to an information processing system, an information processing method, and a program.

BACKGROUND

Many technologies (seat occupancy detection technologies) have been developed heretofore, to detect whether a person is seated on a chair or another seating unit. Seat occupancy detection technologies can be used for various applications, such as determination of occupancy and absence of an employee in a workplace, and recognition of sitting and non-sitting of a passenger in a railway vehicle, a bus, or another means of transportation.

For example, Japanese Unexamined Patent Application Publication No. 2018-000425 discloses a system for detecting sitting at and leaving from a game table. This system includes a peripheral device that is disposed around a game table, an infrared sensor that is provided to the peripheral device and that emits infrared rays in a direction of a chair, and a person detection processor that detects presence/absence of a person based on temperature information of the infrared sensor. The system also includes a chair detection processor that detects presence/absence of the chair based on temperature information of the infrared sensor. The system further includes a state determination processor that determines the state around the game table upon receiving detection results of the person detection processor and the chair detection processor.

In another example, Japanese Unexamined Patent Application Publication No. 2006-226823 discloses a technology of detecting an occupant by using a capacitive sensor that is provided in an insulative film embedded in a seat. This sensor detects an occupant by measuring capacitance that varies depending on pressure when the occupant takes a seat.

BRIEF SUMMARY

Technical Problem

Unfortunately, existing seat occupancy detection technologies are complicated and expensive and are thereby difficult to use for general purposes. In one example, in the system disclosed in Japanese Unexamined Patent Application Publication No. 2018-000425, it is necessary to measure temperature information of a seated person by using the infrared sensor, which makes the system more complicated and expensive, in particular, as the number of seats to be monitored increases. The capacitive sensor that is disclosed in Japanese Unexamined Patent Application Publication No. 2006-226823 requires embedding the insulative film in a seat and has a low versatility.

In view of this, an object of the present invention is to make it easier than before to detect whether a person is seated on a seating unit.

Solution to Problem

One aspect of the present invention provides an information processing system including a first radio tag and an information processing device. The first radio tag stores unique tag identification information and is configured to be attached to a seating surface or a backrest surface of a seating unit. The information processing device includes a storage that stores information on a user of a seating unit and tag identification information of a radio tag attached to the seating unit, in an associated manner. The information processing device also includes an acquisition unit and a control unit. The acquisition unit is configured to acquire the tag identification information when the first radio tag transmits a signal containing the tag identification information. The control unit is configured to determine whether the user is seated on the seating unit, based on acquisition or non-acquisition of the tag identification information.

Advantageous Effects

The one aspect of the present invention makes it easier than before to detect whether a person is seated on a seating unit.

DETAILED DESCRIPTION

Hereinafter, a seat occupancy and vacancy detection system of one embodiment of an information processing system of the present disclosure will be described with reference to the attached drawings.

In the present disclosure, a "seating unit" is a piece of furniture that is provided in a certain area for the purpose of allowing a person to take a seat, and examples thereof include chairs and sofas. The following describes a chair as an example of the seating unit. The description assumes that the seating unit is a chair for one person, but the seating unit is not limited thereto.

In one embodiment, in order to detect whether a person is seated on a chair, an IoT tag (an example of a radio tag) is attached to the chair. In one embodiment, an Internet of Things (IoT) tag (hereinafter simply referred to as a "tag") is an energy harvesting communication device that generates power based on radio waves in the surrounding environment, and it operates without a battery. However, the tag is not limited thereto. The communication distance of the tag of the present disclosure is not limited and can be changed or adjusted as appropriate, depending on the application.

The tag is attached to a chair at a position so as to come into contact with or come close to a user who is seated on the chair, and for example, the tag is attached to a seating surface or a backrest surface of a chair. While a user is seated on the chair, a part of the user's body covers the tag, and radio waves (signals) cannot be transmitted from the tag or weak radio waves are transmitted from the tag. On the other hand, while a user is not seated on the chair, the tag transmits radio waves normally.

The signal that is transmitted from the tag contains a tag ID that is unique to a corresponding tag (an example of tag identification information). For this reason, when a signal that is transmitted from the tag is received, and a tag ID is acquired from this signal, it can be determined that a user is not seated on the chair corresponding to the tag. When a tag ID cannot be acquired, it can be determined that a user is seated on the chair corresponding to the tag.

In one embodiment, a signal that is transmitted from the tag is able to be received by a wireless device in an area in which the seat occupancy and vacancy detection system is employed. In another embodiment, a signal that is transmitted from the tag is able to be received by a user terminal (e.g., a smartphone or a tablet terminal) that is held by a user.

In one embodiment, upon receiving a tag ID from the tag, a wireless device or a user terminal in an area transmits the received tag ID to a server that is connected to a network. On the basis of whether a tag ID is acquired, the server determines that a user is seated on or leaves the certain chair associated with the tag ID.

Figure 1:
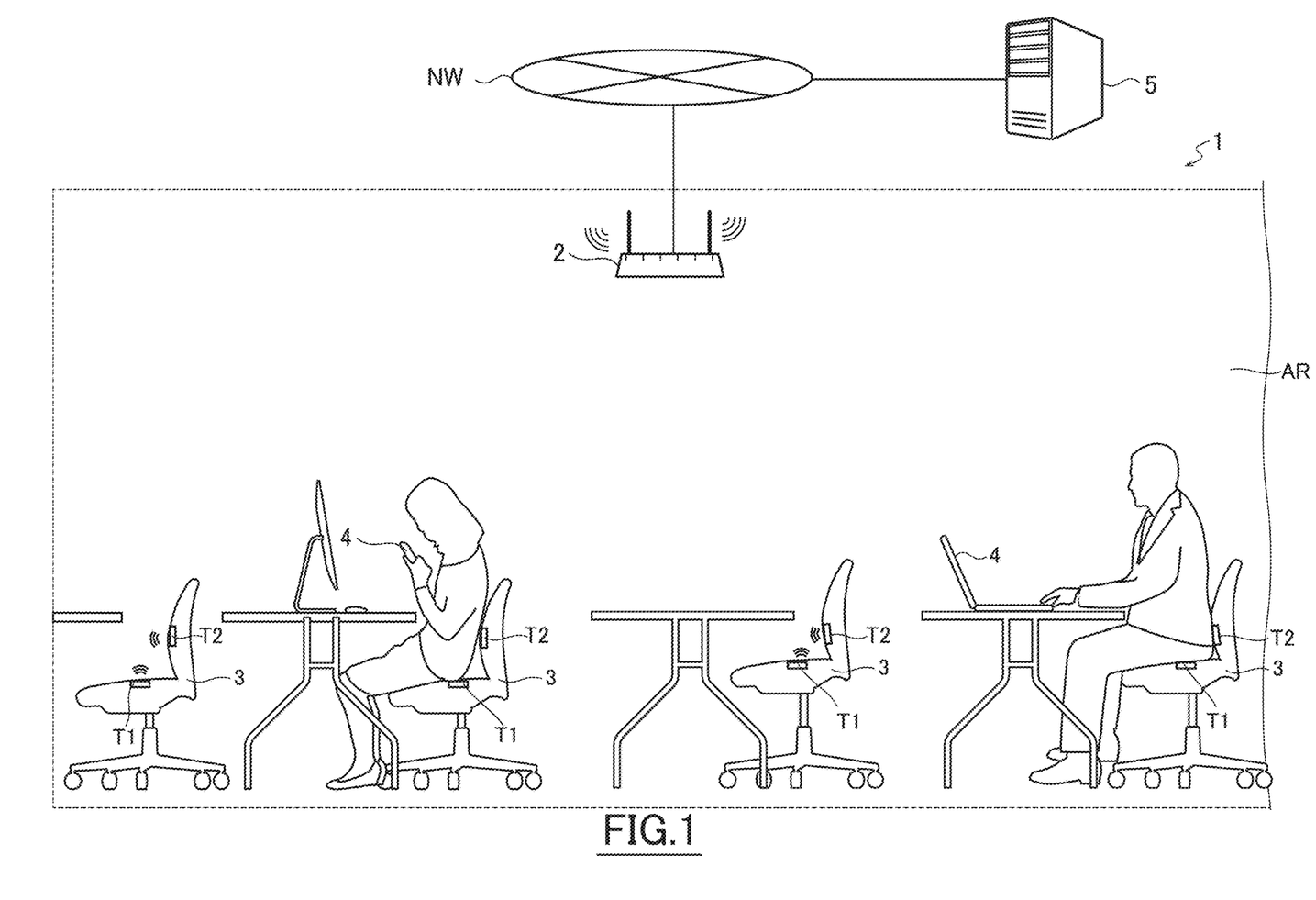
FIG. 1 shows an application example of a seat occupancy and vacancy detection system of one embodiment.

A system configuration of the seat occupancy and vacancy detection system 1 of one embodiment will be described with reference to FIGS. 1 to 3, hereinafter. FIG. 1 shows an application example of the seat occupancy and vacancy detection system 1 of one embodiment. The seat occupancy and vacancy detection system 1 of this one example is configured to detect sitting and leaving of a user (e.g., an employee) who uses a chair in a workplace equipped with a plurality of chairs.

With reference to FIG. 1, a plurality of chairs 3 are placed in an area AR in which the seat occupancy and vacancy detection system 1 is employed. In the area AR, users are respectively assigned to the chairs 3 in advance, and the user sits down on the chair 3 that is assigned to the user himself or herself, as necessary.

Figure 2:
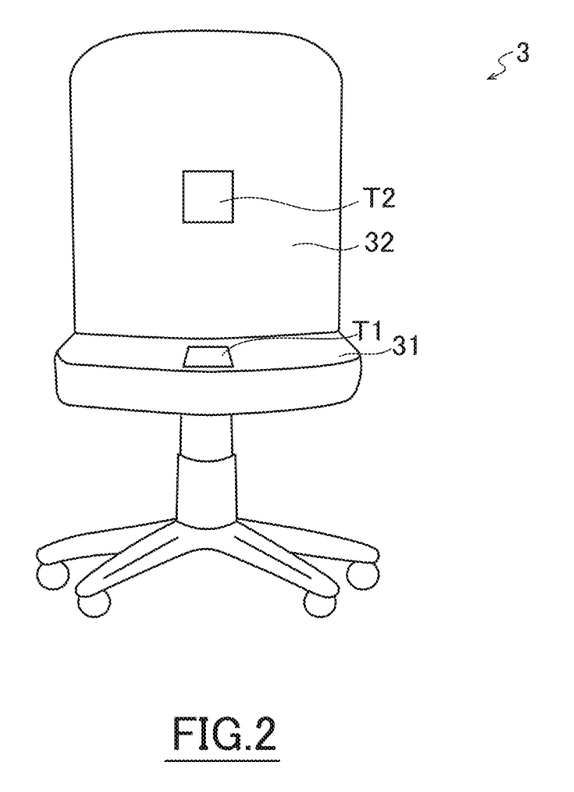
FIG. 2 is a front view of a chair shown in FIG. 1.

FIG. 2 is a front view of a chair shown in FIG. 1. A chair 3 has a seat 31 and a backrest 32. As shown in FIG. 2, a tag T1 is attached to the seat 31, whereas a tag T2 is attached to the backrest 32. Each of the tags T1 and T2 is an example of a first radio tag.

Although details will be described later, each of the tags T1 and T2 is, for example, an energy harvesting communication device that generates power based on radio waves in the surrounding environment and thereby does not have a battery. The tags T1 and T2 can be incorporated with a temperature sensor that measures surrounding temperature.

Each of the tags T1 and T2 transmits a signal (a packet, which will be described later) that contains a unique tag ID, at predetermined intervals, for example, at short intervals of approximately one to ten seconds. In one embodiment, the signal that is transmitted from each tag contains a tag ID, which is unique to a source tag. In another embodiment, the signal that is transmitted from each tag contains a tag ID, which is unique to a source tag, and also contains a measured value of the temperature sensor (referred to as "sensor data").

The following describes a case in which the signal that is transmitted from each tag contains a tag ID and sensor data. In the following description, a tag ID and sensor data are collectively referred to as "tag information."

The communication distances of the tags T1 and T2 are not limited, but for example, they are in a range of 3 to 10 meters. Each of the tags T1 and T2 performs a wireless communication with low consumption of power. Examples of the communication protocol include Bluetooth Low Energy (registered trademark) (hereinafter abbreviated as "BLE"), Bluetooth (registered trademark), and ZigBee (registered trademark). The following describes an example of a case of performing a BLE communication.

The tags T1 and T2 that support the BLE standard, broadcast an advertising packet (described later) to a surrounding BLE terminal. The packet that is transmitted by each of the tags T1 and T2 contains tag information (a tag ID and sensor data).

As shown in FIG. 1, the seat occupancy and vacancy detection system 1 includes a wireless device 2 and a management server 5 that is able to communicate with the wireless device 2 via a network NW. The network NW is, for example, a local area network (LAN), a wide area network (WAN), a mobile communication network, or the Internet, but not limited to them.

The wireless device 2 functions as a BLE wireless terminal that receives a packet from each of the tags T1 and T2 attached to a chair 3 by a BLE communication. Upon receiving a packet from each tag, the wireless device 2 transmits a tag ID and sensor data contained in the received packet, to the management server 5.

In the state of being able to normally transmit a packet, each of the tags T1 and T2 transmits a packet at predetermined intervals, as described above, and also, the wireless device 2 transmits tag information to the management server 5 at predetermined intervals accordingly.

The tags T1 and T2 are attached to positions so as to come into contact with or come close to a part of a user's body when the user is seated on a chair 3.

While a user is seated on a chair 3, a part of the user's body covers the tag T1 at the seating surface and the tag T2 at the backrest surface, and radio waves cannot be transmitted normally from each tag. Thus, the wireless device 2 cannot receive a packet from each tag. In this situation, due to not receiving tag information from the wireless device 2, which information should be periodically received unless the user is seated, the management server can recognize that the user corresponding to the chair 3 is seated.

On the other hand, while a user leaves a chair 3, each of the tags T1 and T2 is exposed and transmits radio waves normally, whereby the wireless device 2 receives a packet from each tag and transmits tag information contained in the received packet, to the management server 5. The management server 5 periodically receives the tag information from the wireless device 2 and can thereby recognize that the user leaves the corresponding chair 3.

A user terminal 4 in FIG. 1 is an information processing terminal held by a user, and non-limiting examples of the user terminal 4 include a laptop personal computer, a tablet terminal, and a smartphone.

In one embodiment, the user terminal 4 has, for example, an application that supports BLE, and it is able to communicate with the management server 5 via the network NW and has the same function as the wireless device 2. Specifically, the user terminal 4 may receive a packet from each of the tags T1 and T2 and may transmit tag information contained in the received packet, to the management server 5.

That is, in the seat occupancy and vacancy detection system 1, the management server 5 is supposed to acquire tag information from each of the tags T1 and T2 in the area AR, through at least one of a route (i) in which the wireless device 2 receives tag information from the tag and transmits it to the management server 5 and a route (ii) in which a user terminal 4 receives tag information from the tag and transmits it to the management server 5. However, the route is not limited thereto.

The management server 5 is an example of an information processing device that manages a state in which a user is seated on or leaves a chair 3 in the area AR in FIG. 1.

Figure 3:
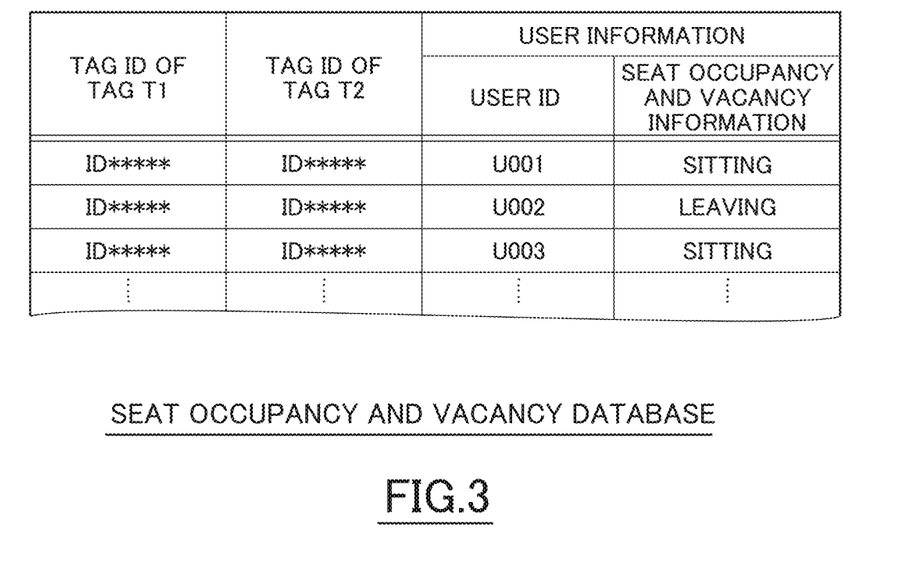
FIG. 3 shows an example of data components of a seat occupancy and vacancy database.

The management server 5 includes a seat occupancy and vacancy database, as illustrated in FIG. 3. In the seat occupancy and vacancy database illustrated in FIG. 3, one record is set for one chair 3 in the area AR.

In each record, tag IDs of the tags T1 and T2 that are attached to a corresponding chair 3, a user ID that is identification information of a user assigned to the corresponding chair 3, and seat occupancy and vacancy information that shows whether the user is seated on or leaves the corresponding chair 3 (information showing "SITTING" or "LEAVING"), are associated with each other.

In accordance with whether the management server 5 acquires tag information from the wireless device 2 or a user terminal 4, seat occupancy and vacancy information of a corresponding record is appropriately updated.

Next, a configuration of each device of the seat occupancy and vacancy detection system 1 of one embodiment will be described with reference to FIGS. 4 and 5.

Figure 4:
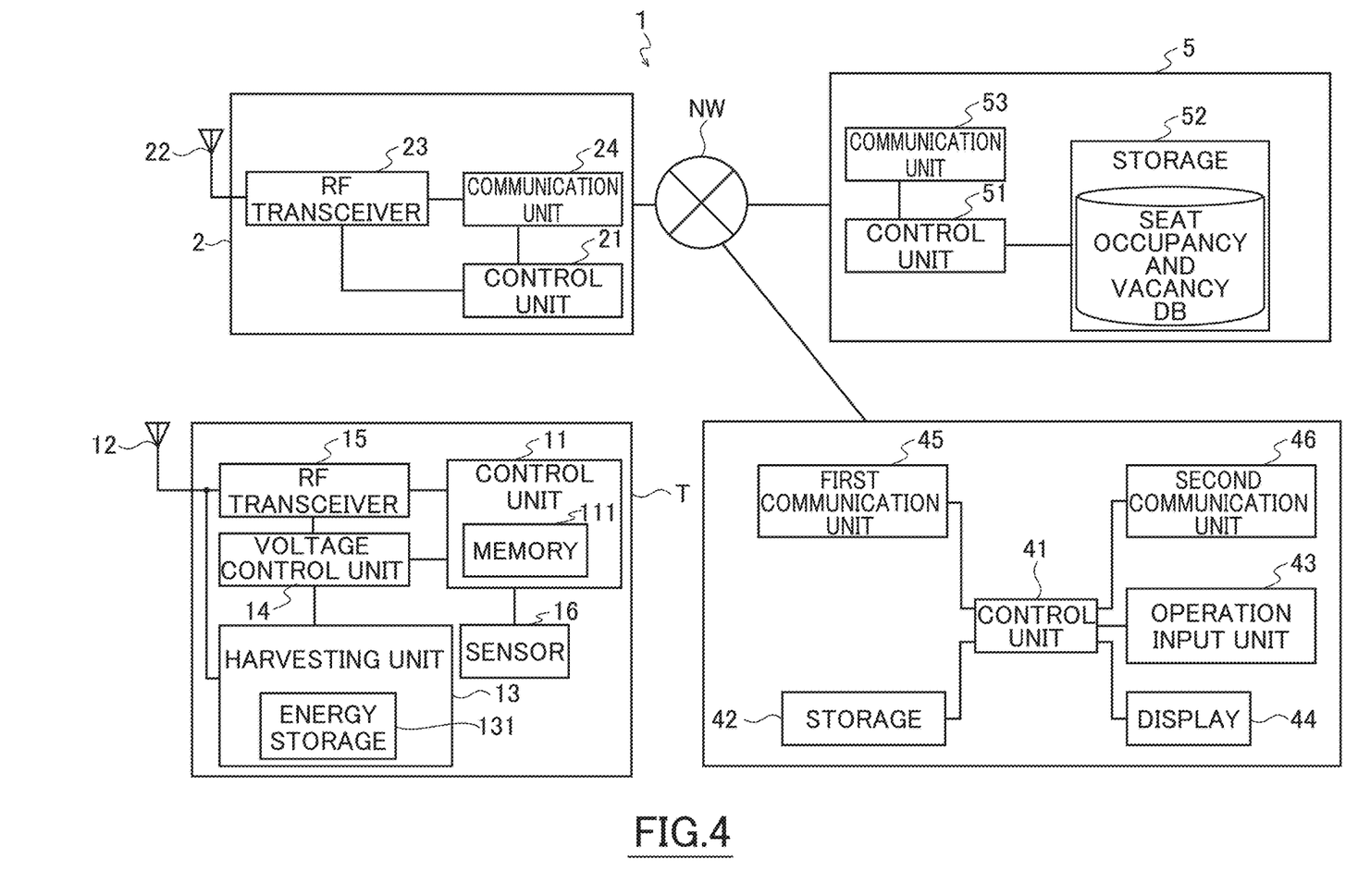
FIG. 4 is a block diagram showing an internal configuration of each device of the seat occupancy and vacancy detection system of one embodiment.

FIG. 4 is a block diagram showing an internal configuration of each device of the seat occupancy and vacancy detection system 1 of this embodiment. FIG. 5 shows a structure of an advertising packet that is transmitted from each of the tags T1 and T2.

In the following description, when a matter that applies to each of the tags T1 and T2 is described, the tag T1 or T2 is represented by a "tag 'T.'"

With reference to FIG. 4, the tag "T" includes, for example, a control unit 11, an antenna 12, a harvesting unit 13, a voltage control unit 14, an RF transceiver 15, and a sensor 16.

Although the whole shape of the tag "T" is not shown in the drawing, the tag "T" is, for example, a thin film member including a conductive metal foil that has a predetermined pattern for forming an antenna 12 and a sensor 16, and also including an IC chip connected to the metal foil. The IC chip is mounted with the control unit 11, the harvesting unit 13, the voltage control unit 14, and the RF transceiver 15.

The control unit 11 includes a microprocessor and a memory 111 and controls the whole tag "T." The memory 111 is a random access memory (RAM) or a read only memory (ROM) and stores a tag ID that is identification information unique to a tag "T," sensor data that is output from the sensor 16, etc., in addition to a program that is executed by the microprocessor.

The harvesting unit 13 performs energy harvesting to generate power based on radio waves in the surrounding environment (e.g., radio waves of surrounding wireless communication), and it stores the power in an internal energy storage 131. In this embodiment, the harvesting unit 13 converts, for example, a radio signal that is received by the antenna 12, into DC voltage, and it stores it in the energy storage 131. The energy storage 131 is a capacitor, for example. In the case of using a capacitor, one that is mounted on a semiconductor chip (that is, an on-die capacitor) may be used.

Radio waves that are used in energy harvesting by the harvesting unit 13 are radio waves of a plurality of different frequency bands over a wide frequency bandwidth. Examples of the radio waves include radio waves for wireless communication in frequency bands employed in mobile communication systems such as 3G to 5G systems, radio waves for wireless communication in frequency bands employed in communication standards such as Bluetooth (registered trademark) and Wi-Fi (registered trademark), radio waves for wireless communication in 2.4 GHz band, represented by communication protocols such as ZigBee (registered trademark) and Thread, and radio waves for wireless communication in frequency bands employed in RFID (e.g., 900 MHz band and 13.56 MHz band).

In general, radio waves as illustrated herein are applicable to almost all areas. The tag "T" operates by power that is obtained in energy harvesting based on radio waves in the surrounding environment by the harvesting unit 13. Thus, it is not necessary to mount a battery on the tag "T," whereby a system cost can be reduced. In addition, due to no need of mounting a battery, a replacement operation of a battery is not required, whereby failure to obtain a tag ID in spite of the presence of a tag, does not occur.

The voltage control unit 14 supplies operating voltage to the control unit 11 and the RF transceiver 15 and monitors voltage of the energy storage 131 to switch power modes in accordance with result of monitoring. When the voltage of the energy storage 131 is not more than a predetermined threshold, the power mode is switched to a first mode for operating only minimal circuits. Under these conditions, the control unit 11 and the RF transceiver 15 do not perform processes such as generation of a packet (described later) and transmission of a radio signal. When the voltage of the energy storage 131 is charged to a degree not less than the predetermined threshold, the power mode is switched to a second mode for executing a normal processing routine. Under these conditions, the control unit 11 and the RF transceiver 15 perform various processes, including generation of a packet and transmission of a radio signal.

When the voltage of the energy storage 131 is charged to a degree not less than the predetermined threshold, the control unit 11 may store sensor data that is measured by the sensor 16, in the memory 111, together with data of the time of measuring the sensor data, even though the power mode is in the first mode. In this case, at the time the power mode is switched from the first mode to the second mode, the control unit 11 may generate and transmit a packet that contains the sensor data and the data of the time of measuring the sensor data, which are stored in the memory 111.

The sensor 16 measures data of temperature around the tag "T" (that is, sensor data). The sensor data is temporarily stored in the memory 111 so as to be contained in a packet (described below).

The control unit 11 generates an advertising packet in accordance with a BLE protocol when the power mode is in the second mode.

The advertising packet is a packet that is transmitted by using an advertising channel, in order to implement a BLE broadcast communication. The advertising packet has a packet structure as shown in FIG. 5. Hereinafter, an advertising packet is simply referred to as a "packet" as appropriate.

Figure 5:
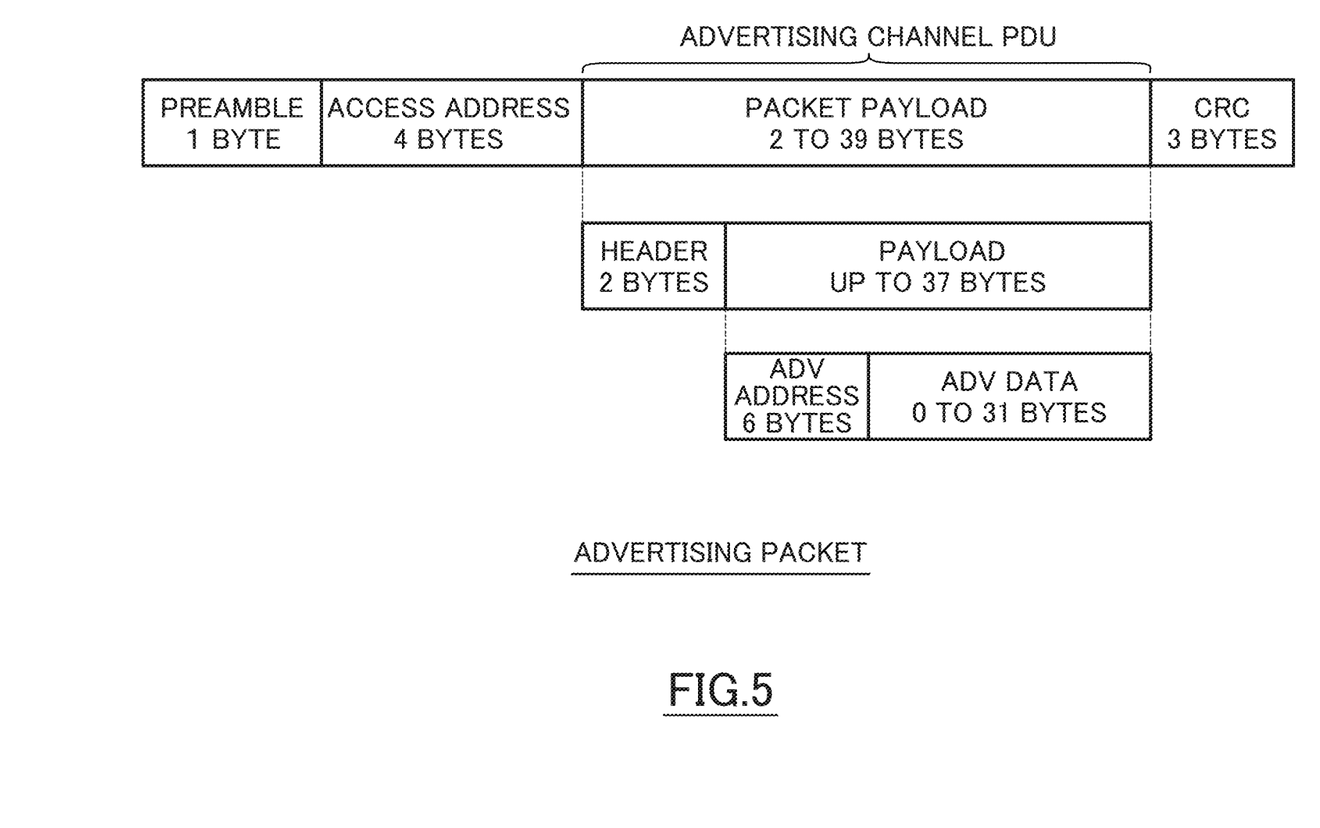
FIG. 5 shows a structure of an advertising packet that is transmitted from an IoT tag.

FIG. 5 shows a preamble and an access address that are each a predetermined fixed value. CRC is a cyclic redundancy check code and is check data that is calculated with respect to a packet payload (that is, an advertising channel protocol data unit (PDU)) by using a predetermined generator polynomial.

The advertising channel PDU (hereinafter simply referred to as a "PDU") is composed of a header and a payload. This payload is composed of an ADV address and ADV data. The ADV address is an address of an advertiser (that is, a tag "T" that is a main device for notification), but it may be a random value set each time transmission is performed, in order to prevent the source from being identified. The ADV data is data (broadcast data) of the advertiser and corresponds to tag information that contains a tag ID and sensor data, which is output from the sensor 16.

The control unit 11 preferably encodes the PDU. Although the method of encoding is not limited, advanced encryption standard (AES) using a key length of 128 bits can be used, for example.

The RF transceiver 15 performs predetermined digital modulation (e.g., Gaussian frequency shift keying (GFSK)) on a packet (baseband signal) to be transmitted and then performs quadrature modulation thereon, and it sends a high-frequency signal (in the case of BLE, a signal of a frequency band of 2.4 GHz) to the antenna 12.

The antenna 12 includes a transmission antenna and a power generation antenna. The transmission antenna transmits a high-frequency radio signal (packet) that is sent from the RF transceiver 15. On the other hand, the power generation antenna receives, for example, radio waves in the surrounding environment, and it functions as a rectenna in cooperation with the harvesting unit 13.

As shown in FIG. 4, a user terminal 4 includes, for example, a control unit 41, a storage 42, an operation input unit 43, a display 44, a first communication unit 45, and a second communication unit 46.

The control unit 41 is composed mainly of a microprocessor and controls the whole user terminal 4.

In one embodiment, the control unit 41 loads and executes an application that supports BLE, which is stored in the storage 42.

The storage 42 is a storage device, such as a solid state drive (SSD), and it stores various programs to be executed by the control unit 41, such as the above-described application that supports BLE.

The operation input unit 43 is an input interface that receives operation input from a user who operates to execute each program, and it may be a touch panel input unit provided to a display panel of the display 44.

The display 44 includes a display panel, such as an LCD, and a driving circuit for the display panel, and it displays a result of executing a program by the control unit 41.

The first communication unit 45 wirelessly communicates with an object, for example, in a communication range smaller than that of the second communication unit, and it receives a packet that is broadcasted by the tag "T," for example.

The second communication unit 46 is a communication interface for communicating with the management server 5 via the network NW. In one embodiment, the control unit 41 receives a packet from the tag "T" via the first control unit 45 and obtains tag information. Moreover, the control unit 41 transmits the tag information, which is obtained from the tag "T," to the management server 5 via the second communication unit 46.

As shown in FIG. 4, the management server 5 includes, for example, a control unit 51, a storage 52, and a communication unit 53.

The control unit 51 is composed mainly of a microprocessor and controls the whole management server 5.

The storage 52 (an example of a storage) includes a mass storage device, such as a hard disk drive (HDD), and it stores the seat occupancy and vacancy database.

The communication unit 53 functions as a communication interface for communicating with the wireless device 2 and a user terminal 4.

The control unit 51 executes a server program to function as an acquisition unit that acquires a tag ID via the wireless device 2 or a user terminal 4 when the tag "T" transmits a packet that contains a tag ID.

Upon executing the server program, the control unit 51 determines whether a user is seated on a corresponding chair 3, based on acquisition or non-acquisition of a tag ID, and it updates the seat occupancy and vacancy database (FIG. 3).

Specifically, a process of updating the seat occupancy and vacancy database is performed as follows.

The tags T1 and T2 are respectively attached to a seating surface and a backrest surface of each chair 3 in the area AR and broadcast a packet at predetermined intervals (e.g., at short intervals of approximately one to ten seconds). Upon receiving a packet, the wireless device 2 or a user terminal 4 transmits tag information (a tag ID and sensor data) contained in the packet, to the management server 5. When not being able to receive a packet, the wireless device 2 or a user terminal 4 transmits no information to the management server 5.

In light of the above, for example, when receiving the same tag ID at a predetermined number of times within a predetermined time, the control unit 51 of the management server 5 determines that the tag ID is acquired, and it writes a word "LEAVING" as seat occupancy and vacancy information corresponding to the tag ID, in the seat occupancy and vacancy database. Conversely, in the case in which the same tag ID cannot be received within a predetermined time, or the number of times of reception is less than the predetermined number of times even though the same tag ID is received, a word "SITTING" is written as seat occupancy and vacancy information corresponding to the tag ID.

It may be determined that a tag ID is acquired when the tag ID is received once, and it may be determined that a tag ID cannot be acquired when the tag ID cannot be received once. In such cases, the seat occupancy and vacancy information may be rewritten. However, accuracy of the seat occupancy and vacancy information can be improved by determining acquisition or non-acquisition of a tag ID based on the number of times of reception within a predetermined time.

Next, results of measurement using the tags T1 and T2 that are respectively attached to the seating surface and the backrest surface of each chair 3 will be described with reference to FIGS. 6 and 7.

Figure 6:
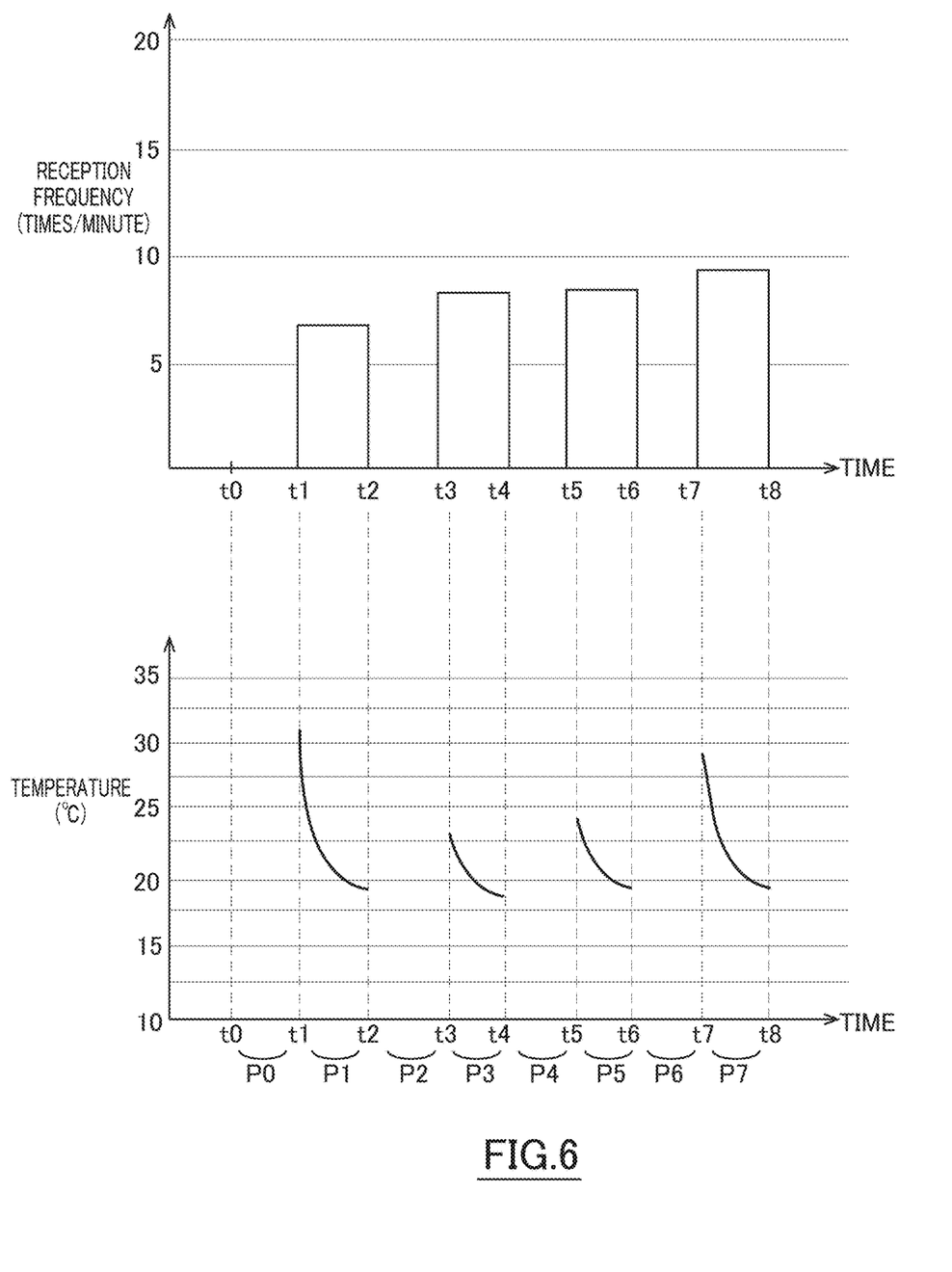
FIG. 6 illustrates a result of measurement using a tag attached to a seating surface.

FIG. 6 illustrates a result of measurement using the tag T1 attached to the seating surface of a chair 3. FIG. 7 illustrates a result of measurement using the tag T2 attached to the backrest surface of the chair 3.

Figure 7:
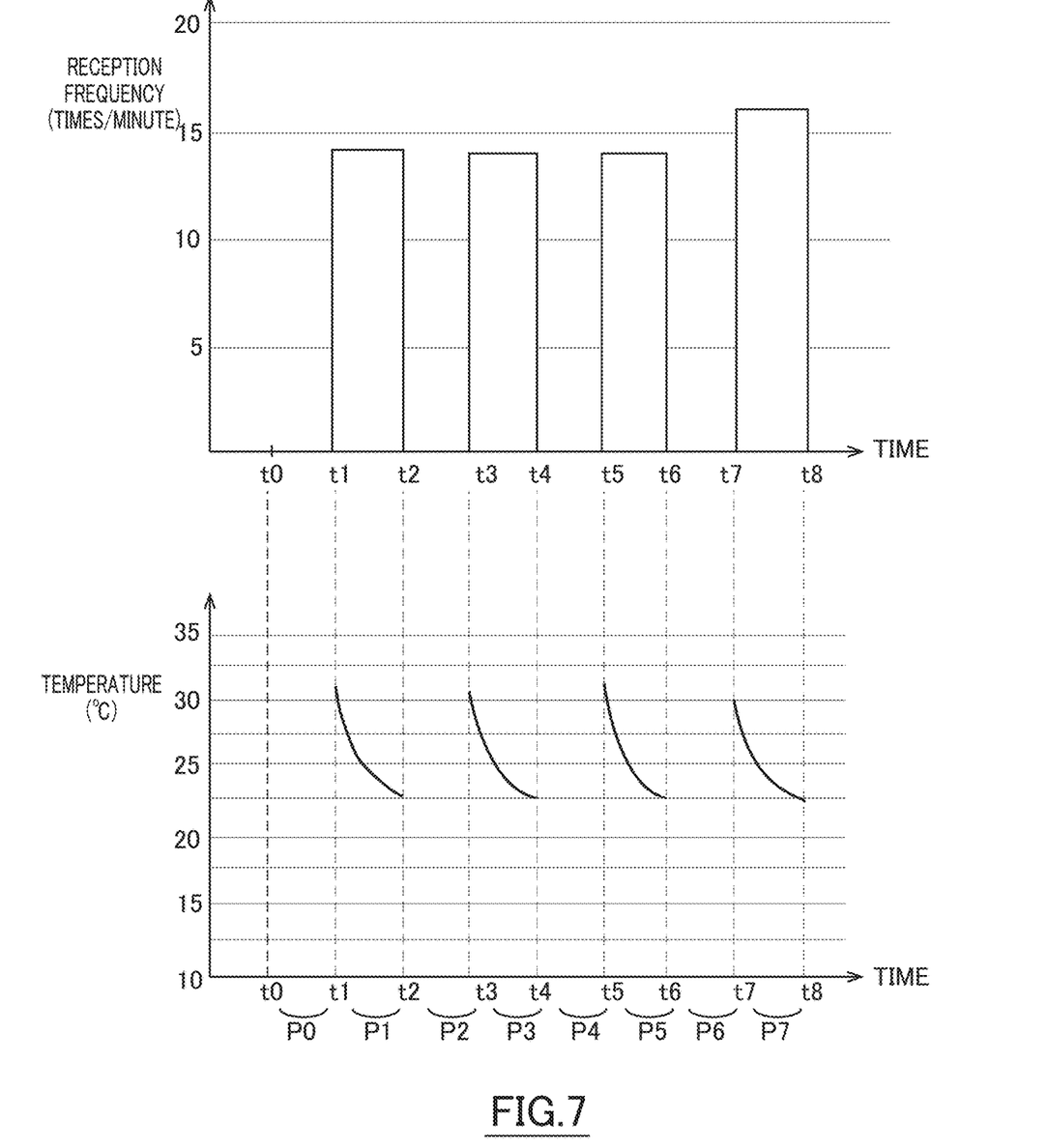
FIG. 7 illustrates a result of measurement using a tag attached to a backrest surface.

FIGS. 6 and 7 show results (in terms of reception frequency and temperature) of receiving tag information of the tags T1 and T2 by the management server 5 when a user repeats leaving and sitting on the chair 3 attached with the tags T1 and T2, approximately every 15 minutes, as described below. Herein, the reception frequency shows an average number of times of receiving tag information per minute in each period (approximately 15 minutes).

Period P0 (time t0 to time t1): Sitting
Period P1 (between times t1 and t2): Leaving
Period P2 (between times t2 and t3): Sitting
Period P3 (between times t3 and t4): Leaving
Period P4 (between times t4 and t5): Sitting
Period P5 (between times t5 and t6): Leaving
Period P6 (between times t6 and t7): Sitting Period P7 (between times t7 and t8): Leaving As shown in FIGS. 6 and 7, the management server 5 can hardly receive the tag information of each of the tags T1 and T2 in the periods (P0, P2, P4, and P6) in which the user is seated, whereas the frequency of being able to receive the tag information of each of the tags T1 and T2 in the periods (P1, P3, P5, and P7) in which the user leaves the seat, is high. Thus, sitting or leaving of a user can be determined by comparing the frequency of receiving tag information with a predetermined threshold.

In addition, as shown in FIGS. 6 and 7, at times t1, t3, t5, and t7 soon after the user leaves the seat, the management server 5 can immediately receive the tag information. The temperature, which is shown by the sensor data from each of the tags T1 and T2, is high at that time, and it is then gradually decreased as the chair 3 is cooled.

As described above, in the seat occupancy and vacancy detection system 1 of one embodiment, the tags T1 and T2, which are small in size and operate with low consumption of power, are attached to a chair 3 and transmit a packet containing at least a tag ID, for example, periodically, and the management server 5 acquires the tag ID via the wireless device 2 or a user terminal 4. The management server 5 then determines whether a user of the chair 3 is seated on the chair 3, based on acquisition or non-acquisition of the tag ID. Thus, in the seat occupancy and vacancy detection system 1 of one embodiment, whether a user is seated on a chair 3 can be detected easier than before, only by attaching a tag to a seating surface or a backrest surface of each chair 3 in the area AR.

FIGS. 6 and 7 indicate an increase in the temperatures of the seating surface and the backrest surface of a chair 3 immediately after a user who has been seated on the chair 3 leaves the seat. In more detail, while a user is seated, a part of the user's body covers the seating surface tag T1 and the backrest surface tag T2, which inhibits each tag from normally transmitting a packet. On the other hand, immediately after a user leaves the seat, each tag can normally transmit a packet, and sensor data that is contained in the packet shows a high temperature. From this point of view, when sensor data, which is contained in tag information acquired by the management server 5, shows a value higher than a predetermined temperature, the event that a user, not a bag or the like, has been seated, can be recognized with higher accuracy.

Figure 8:
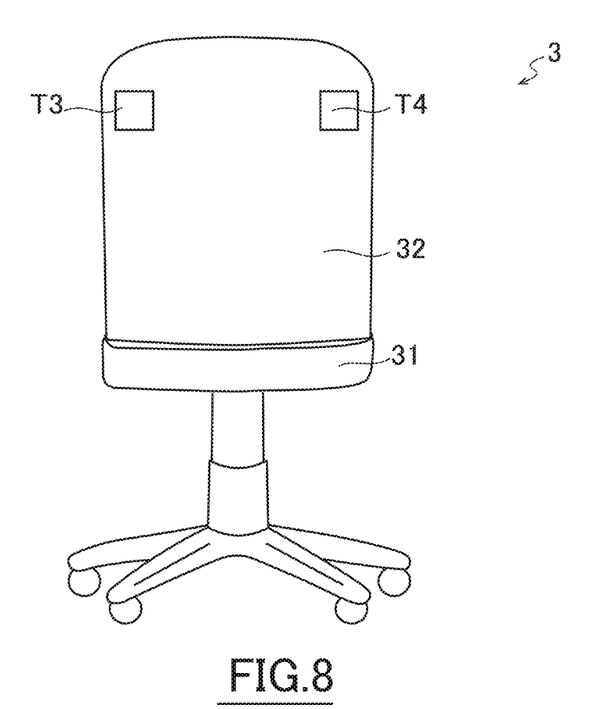
FIG. 8 is an example of a rear view of a chair shown in FIG. 1.

In one embodiment, tags T3 and T4 for measuring a room temperature in the area AR may also be attached to a chair 3, as shown in FIG. 8. FIG. 8 is a rear view of a chair 3. Although two tags are attached to the chair 3 in FIG. 8, the number of the tags is not limited, and a single tag may be attached to a chair 3. In addition, the tags T3 and T4 are attached to a rear side of the backrest 32 of the chair 3 in FIG. 8, but the attaching positions of the tags are not limited thereto. The tags T3 and T4 may be attached to any positions that will not be affected by the body heat of a user who is seated. For example, a leg, a side surface of the backrest 32, or the like of the chair 3 can be used as an alternative position. Each of the tags T3 and T4 is an example of a second radio tag.

The tags T3 and T4 are attached to the chair 3 at positions so as to not come into contact with a user's body, whereby the management server 5 can receive tag information irrespective of sitting/leaving of a user.

As described above, a temperature value that is shown by sensor data acquired from each of the tags T1 and T2 is higher than a room temperature immediately after a user who has been seated leaves the seat. In consideration of this, in one embodiment, when a temperature value that is shown by sensor data acquired from the tag T1 or T2 is higher than a temperature value (that is, a room temperature) that is shown by sensor data acquired from the tag T3 or T4, it may be determined that a user has been seated till then. This process enables determining that a user has been seated till then, with high accuracy, compared with determination based only on temperature shown by sensor data acquired from the tag T1 or T2.

Figure 9:
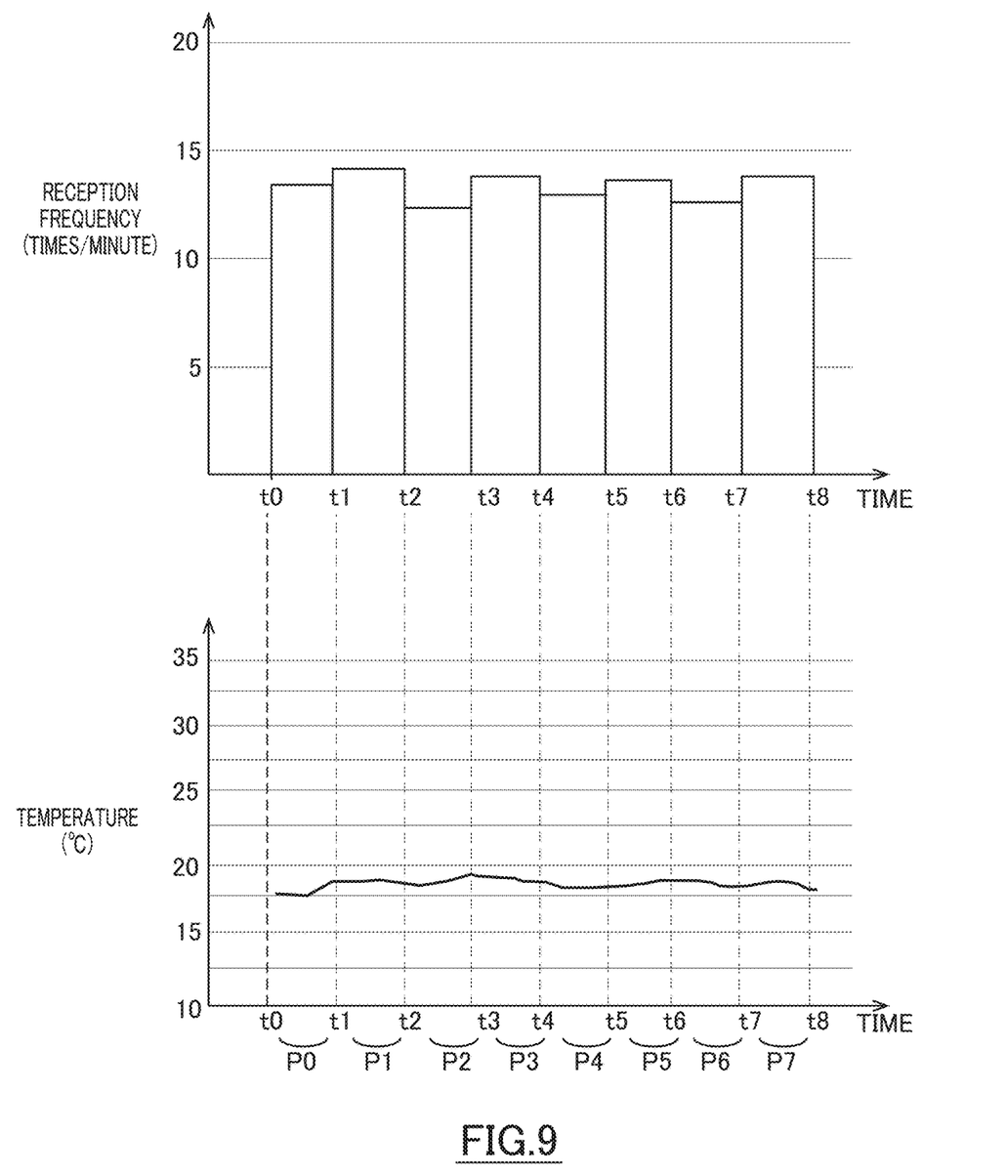
FIG. 9 illustrates a result of measurement using a tag attached to a rear surface of the backrest.

FIG. 9 shows a result of measuring temperature in the same manner as in the case of using the tags T1 and T2 by attaching the tags T3 and T4 to a chair 3, which result is shown by sensor data. As shown in FIG. 9, pieces of tag information of the tags T3 and T4 are received in all time periods from time t0 to t8, and temperature values shown by the sensor data from the tags T3 and T4 are approximately in a room temperature range of 17.5 to 20° C. in all time periods. In more detail, at times t1, t3, t5, and t7 immediately after a user leaves the seat, the temperature values shown by the sensor data from the tags T1 and T2 are sufficiently higher than the temperature values shown by the sensor data from the tags T3 and T4.

The above-described tags T1 and T2, which are energy harvesting radio tags that operate by obtaining energy from surrounding radio waves, are appropriate for long term operation. However, the radio tag for use is not limited to an energy harvesting type and may be an RFID tag that operates in the UHF band, for example. In this case, an interrogator for communicating with an RFID tag may be preferably provided to the wireless device 2.

Although embodiments of the information processing system, the information processing method, and the program of the present invention are described above, the present invention should not be limited to the foregoing embodiments. In addition, the embodiments described above can be variously modified and altered and can be combined with each other, within the scope not departing from the gist of the present invention.

The present invention is related to Japanese Patent Application No. 2021-059174 filed with the Japan Patent Office on Mar. 31, 2021, the entire contents of which are incorporated into this specification by reference.

The invention claimed is:

1. An information processing system comprising:
 a first radio tag storing unique tag identification information, the first radio tag configured to be attached to a seating surface or a backrest surface of a seating unit; and
 an information processing device comprising:
  a storage that stores information on a user of a seating unit and tag identification information of a radio tag attached to a seating unit, in an associated manner, and
  a processor configured to:
   acquire the tag identification information when the first radio tag transmits a signal containing the tag identification information, and
   determine whether the user is seated on the seating unit, based on acquisition or non-acquisition of the tag identification information.

2. The information processing system according to claim 1, wherein the processor is configured to determine that the tag identification information is acquired, when the number of times of receiving the tag identification information within a predetermined time is a predetermined value or greater.

3. The information processing system according to claim 1, wherein the first radio tag is configured to operate by obtaining energy from surrounding radio waves.

4. The information processing system according to claim 1, wherein the first radio tag includes a sensor that measures temperature, and the processor is configured to determine whether the user has been seated on the seating unit, based on measurement information of the sensor.

5. The information processing system according to claim 4, further comprising a second radio tag including a sensor that measures temperature and storing unique tag identification information, the second radio tag configured to be attached to the seating unit at a position so as to not come close to the user,
   wherein the processor is configured to determine that the user has been seated on the seating unit, when a temperature measured by the first radio tag is higher than a temperature measured by the second radio tag.

6. An information processing method for processing information between a radio tag and an information processing device,
   the radio tag storing unique tag identification information, the radio tag configured to be attached to a seating surface or a backrest surface of a seating unit,
   the information processing device comprising a storage that stores information on a user of a seating unit and tag identification information of a radio tag attached to the seating unit, in an associated manner,
   the method comprising:
      transmitting, by the radio tag, a signal containing the tag identification information; and
      determining, by the information processing device, whether the user is seated on the seating unit, based on acquisition or non-acquisition of the tag identification information contained in the signal transmitted by the radio tag.

7. A non-transitory recording medium containing a program, the program configured to, when installed in an information processing device, cause a computer to execute a predetermined method, the information processing device configured to process information contained in a signal transmitted by a radio tag, the radio tag storing unique tag identification information, the radio tag configured to be attached to a seating surface or a backrest surface of a seating unit, the method comprising:
   an acquisition step of acquiring tag identification information when the radio tag transmits a signal containing the tag identification information; and
   a determination step of, when tag identification information is acquired in the acquisition step, determining that a user corresponding to tag identification information acquired in the acquisition step is seated on the seating unit, by referring to a storage that stores information on a user of a seating unit and tag identification information of a radio tag attached to the seating unit, in an associated manner.

* * * * *